UNITED STATES PATENT OFFICE.

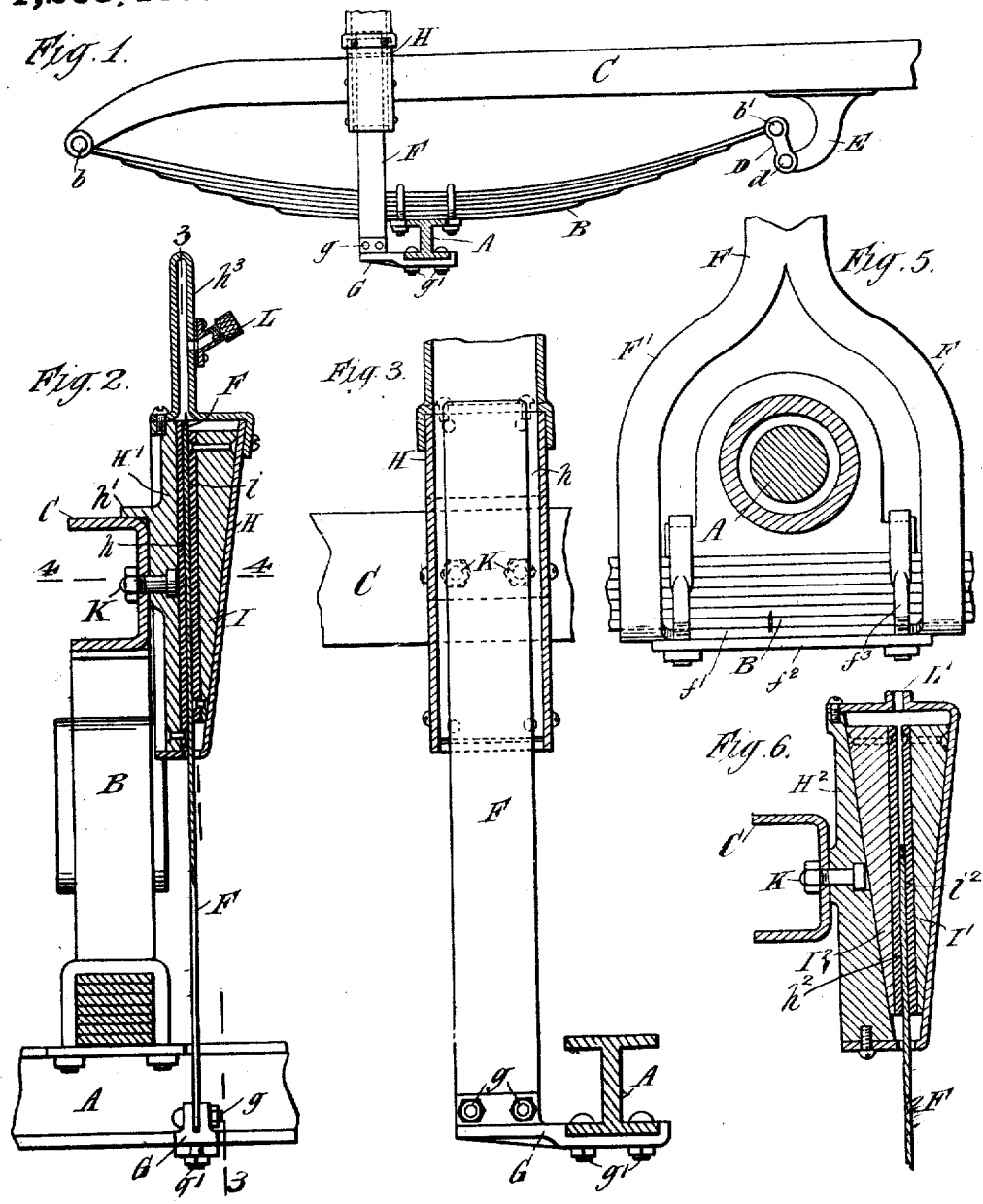

WILLIAM R. RENO, OF LOUISVILLE, KENTUCKY.

SHOCK-ABSORBER AND THE LIKE.

1,263,469.　　　　　Specification of Letters Patent.　　Patented Apr. 23, 1918.

Application filed February 15, 1917.　Serial No. 148,730.

*To all whom it may concern:*

Be it known that I, WILLIAM R. RENO, a citizen of the United States, residing at Louisville, county of Jefferson, and State of Kentucky, have invented certain new and useful Improvements in Shock-Absorbers and the like, fully described and represented in the following specification and the accompanying drawings, forming a part of the same.

The present invention relates particularly to shock absorbers, but the invention is applicable also to other devices in which the movement of a spring or other moving member is to be checked or damped.

In the shock absorbers hitherto known to me the mechanism was such that either the braking pressure was invariable or it was a function of the velocity, at any instant, of the device to be checked. By the first arrangement when the braking pressure is invariable, that is to say, constant for all shock absorbing operations, there is either too little braking action for heavy shocks or too much for light shocks. With the second arrangement the value of the average braking effect is about one half that of the maximum braking effect due to the initial velocity of the device to be checked. Consequently, in a shock absorber constructed on such a plan, more time is required to absorb a shock than if the pressure due to the maximum velocity of the device to be checked, was maintained throughout the braking period.

The object of the present invention is to provide a checking device particularly suitable as a shock absorber for vehicles by which the braking pressure shall, during any given braking operation, be substantially uniform, but will, if necessary, vary for the different braking operations according to the initial velocity of the device to be checked. As a consequence of this the device to be checked will have its energy absorbed more quickly than with the devices hitherto known, while at the same time the braking pressure will not exceed a reasonable maximum value appropriate for the particular shock to be absorbed. A further object of the invention is to provide a device which will be exceedingly simple in construction and operation, and, hence, will require practically no attention.

With these general objects in view and others which will be obvious to those skilled in the art, from the description hereinafter, the invention consists in the features, details of construction and combinations of parts which will first be described in connection with the accompanying drawings, and then particularly pointed out.

In the drawings—

Figure 1 is a side elevation illustrating one embodiment of the invention applied to the axle and body of a vehicle where the spring is located on top of the axle;

Fig. 2 is a transverse section partly in elevation, of one embodiment of the invention in which a single wedge is employed;

Fig. 3 is a section on the line 3—3, Fig. 2;
Fig. 4 is a section on the line 4—4, Fig. 2;
Fig. 5 is a detailed view illustrating a modification of the device suitable for attachment to a vehicle having its spring below the axle, and

Fig. 6 is a sectional view showing a modification of the device employing two wedges.

Referring to Figs. 1 to 4 of the drawings, A indicates an axle; B a spring and C a part of the chassis of a vehicle. The spring, in the modification shown, has one eye pivotally connected, as at $b$, to the chassis, and its other eye pivotally connected, as at $b'$, to a shackle D pivoted at $d$ to a spring hanger E secured to the chassis. The braking device illustrated, comprises a friction plate having plane surfaces parallel to each other on opposite sides of the plate. This plate is arranged to be connected to the axle in any suitable manner. In the best embodiment of the invention, the friction plate is in the form of a strip of resilient material, such. for example, as spring steel, as indicated at F. Its lower end is secured in any suitable way, as, for example, by inserting the end in the slot of a bracket G, in which slot the friction strip or plate is held by suitable means, as, for example, the bolts $g$. The bracket G is suitably secured to the axle, as, for example, by bolts $g'$. The friction plate projects through a slot in the bottom of a brake casing, indicated at H, this casing, in the present example, having an interior surface inclined to coact with the correspondingly inclined surface of a wedge I, whose base is arranged to provide a friction surface bearing against the friction plate, as, for example, by providing this base surface with compressible resilient friction material, such, for example, as leather, this friction material being indicated at $i$, Fig. 2. The leather covering the base surface of the wedge may be secured to the wedge in any suitable way, as, for example, by rivets, as shown. In order that a uniform area of the friction plate F may contact with the friction surface of the wedge, the upper end of the casing has an opening through which the plate may project. A suitable cap $h^3$ may be secured to the top of the casing, as shown in Fig. 2, whereby the upper end of the friction plate F is protected.

Since the tendency of the wedge during the downward movement of the friction plate is to create a pressure on the friction plate in a lateral direction, the casing H is also provided with a suitable reaction device arranged to bear against the friction plate on the side opposite the wedge I and give a straight thrust reaction normal to the friction plate and directly in opposition to the pressure produced by the wedge I. In the present example this reaction device is formed as one wall of the casing, as indicated at H', and in the best embodiment of the invention the inner face of this wall is also provided with a compressible and resilient friction surface, as by providing the wall H' with a leather layer or cover, $h$ which is riveted in place, as shown. The casing H is suitably secured to the chassis C of the vehicle, as, for example, by means of a bolt K passing through the wall H' and through a hole in the chassis, and provided with a nut. The wall H' may be provided with a lug, as indicated at $h'$ which bears against the upper edge of the chassis frame and thus takes the shear, in a downward direction, from the bolt K. The upper end of the casing H is provided with suitable means for supplying oil or the like to the friction surfaces. In the present example this means consists of an oil-cup, indicated at L, secured to the side of the cap $h^3$, by means of which oil may be supplied from time to time to the friction surfaces.

The operation of the mechanism thus far described is as follows: When the spring B is compressed the friction plate F moves upward relative to the casing, and, owing to the frictional contact between one of its surfaces and the wedge I, the wedge is lifted or loosened in the casing, so that there is practically no appreciable retarding action on the friction plate during such upward movement. When the spring begins to recoil, the velocity which it attempts to impart to the chassis in an upward direction, is dependent upon the extent to which the spring has been compressed. If the spring has been greatly compressed, its reaction is great, and it will have a tendency to impart a great velocity upward to the chassis. If the spring was only slightly compressed, it will tend to give the chassis only a small velocity upward. The upward movement of the chassis may be considered, so far as the checking actions are concerned, as if it were a downward movement of the friction plate with the chassis stationary. If the friction plate tends to move downward with a high velocity, it will, owing to its frictional contact with the wedge I, tend to draw the latter downward at a velocity related to the velocity of the friction plate. If the friction plate tends to move downward with a low velocity, the wedge I will have a corresponding low velocity. The pull of the friction plate on the wedge constitutes an impulse acting on the wedge and tending to drive the same down the corresponding inclined surface of the casing to a greater or lesser extent proportional to the impulse. If the wedge, including its friction surface, were of non-yielding material, the wedge in all cases would stop at substantially the same point in the casing, and therefore the pressure transmitted laterally to the friction plate by the inclined surfaces, would always be the same. Since, however, the wedge has a compressible friction surface along its base, the wedge may move to different positions downward in the casing, according to the initial impulse imparted to the wedge by the initial movement of the friction plate in a downward direction. Consequently, when the initial velocity of the friction plate is great, the wedge will be driven tighter and will compress its friction material to a greater extent than where the initial impulse was less. The slope of the inclined surfaces of the wedge and casing and the length of these surfaces relative to the length of the friction surface between the friction plate and the compressible material of the wedge, are such that under the maximum impulse to which the wedge is subjected, the reaction of the compressible material, transversely of the wedge, will not be sufficient to throw the wedge upward and loosen it—that is to say, the upward resultant of the transverse reaction of the compressible material will not overcome the friction between the friction plate and wedge and between the inclined surfaces of the wedge and its casing. Hence, the extent to which the wedge is driven downward depends upon the initial velocity of the friction plate relative to the casing, and as soon as the wedge has been driven down to bring the corresponding lateral pressure against the friction plate, it stays in this position until the friction plate stops, and throughout the movement maintains on the friction plate substantially the same pressure as at the commencement of the movement. In other words, the pressure exerted by the wedge against the friction plate, does not decrease as the downward velocity of the friction plate decreases. It will be seen that by this arrangement the braking pressure against the friction plate is determined by the initial velocity of the friction plate relative to the casing, and that whatever the pressure may be, it remains substantially uniform during the continuance of the downward movement of the friction plate relative to the casing. Furthermore, in the construction just described, the pressure per unit of area of the friction plate is also substantially uniform, because the area of the friction surfaces in contact with each other remains constant. When the direction of the friction plate is reversed, the wedge is lifted and the pressure released, with the exception of the slight pressure due to the weight of the wedge itself. Consequently, by this arrangement the energy due to the recoil of the spring is absorbed in about half the time that it would be if the lateral pressure of the brake against the friction plate varied in proportion to the velocity of the plate downward relative to the casing. Therefore, the oscillation of the chassis due to the reaction of the spring, is damped quickly and without employing any greater maximum pressure against the friction plate than would be the case where the braking was proportional to the downward velocity of the friction plate at any instant.

It will be noted that in the example described, the friction plate is formed as a strip which has a relatively considerable portion of its length outside the casing. By making this strip of resilient material, such as spring steel, a relative movement laterally is permitted between the chassis and the member of the vehicle to which the friction plate is attached, because of the bending of the spring strip. The resiliency of this trip causes it to act to a certain extent as a lateral shock absorber.

Furthermore, the lower end of the friction plate may be bifurcated, as indicated at F' in Fig. 5. With this construction, by a proper dimensioning of the bifurcated portion, a greater flexibility of the friction plate is obtainable, thus giving a longer life to the apparatus. Furthermore, such a bifurcated plate is particularly suitable with vehicles having the spring attached below the axle, as illustrated in Fig. 5. In this modification, the bifurcated ends are joined by a plate $f'$ which is clamped beneath the spring by the clamp plate $f^2$ and the spring clips $f^3$, employed in holding the spring to the spring seat.

Referring to the modification of the invention shown in Fig. 6, it will be seen that the casing indicated at $H^2$, has two inclined faces and contains two wedges, indicated at I', I². These wedges have their friction surfaces, $h^2$, $i^2$, arranged to bear on opposite sides of the friction plate. The friction material for these wedges is in this case also compressible and resilient. It will be noted that with this arrangement, one wedge serves as the reaction device for the other wedge. The slopes of the inclined surfaces, as well as the lengths of said inclines, are such that the resilience of the friction material when compressed to the maximum extent, will not be sufficient to lift and thereby loosen the wedges. Also, in this modification the friction plate F does not extend through the top of the casing when the spring is compressed. In this arrangement, the friction area varies during operation, and, hence, the pressure per square unit is variable, instead of constant. Since, however, the total pressure due to the wedge is theoretically uniform, the total braking pressure is theoretically uniform. In practice there may be some deviation from this theoretical action, if the friction plate is drawn too far downward relative to the wedge,—that is to say, is too short. In this construction the oil may be supplied through the opening L', at the top of the casing.

In the best embodiment of the invention, the friction plate has a width less than the interior of the casing, as will be clear from Fig. 3. This permits the friction plate to have a reasonable amount of play transverse to its length during the relative movement of the spring and chassis, thus allowing for the slight longitudinal movement of these two parts relative to each other and, at the same time avoiding any rattle which otherwise would result from the friction plate striking the casing.

It is particularly to be noted that in these embodiments of the invention, no springs are employed to force the wedge downward. Hence, as the action of gravity on the wedge is uniform, there are no parts to change their characteristics by wear or age. This leads to uniformity and reliability of action of the device, even with long continued use. The friction surfaces may be given a liberal length and width without unduly enlarging the apparatus, because of the few parts employed. This adds to the durability of the apparatus.

It has been found in practice that the apparatus is what may be termed self-adjusting as to the load on the vehicle, so that widely varying loads are properly taken care of during recoil of the spring.

The lubricating device L, Fig. 2, is supplied with an oil suitable for use with the friction material. Where the friction material is leather, it is advantageous to employ neat's foot oil, as this serves to keep the leather in a soft and pliable condition. Furthermore, at the time of maximum pressure of the wedge on the friction plate, a small amount of this oil will be squeezed out of the leather or other friction material, and will serve to slightly lubricate the friction plate and leather. Upon the release of the pressure, the leather or other friction material will expand and absorb any free oil remaining on its surface or on the plate in contact with it. In this way, the destruction of the friction material under the high pressure, which it may at times be subjected to, is avoided.

Practical operation of the apparatus has shown that this oiling of the leather friction surfaces is highly important, for with such oiling there seems to be no cutting or tearing of the leather by the rubbing of the friction plate, and the wear, if any, is so small as to be negligible. Furthermore, the recoil of the spring seems to be checked at the proper rate for comfortable riding with variable loads.

What is claimed is:

1. The combination, with a friction plate and a casing, the casing and plate being arranged for movement relative to each other, of means carried by the casing and arranged to apply a substantially uniform braking pressure to said friction plate throughout the relative movement in one direction, said means including a device whereby the value of said pressure is dependent on the initial velocity of said movement.

2. The combination, with a friction plate having plane surfaces on opposite sides, said surfaces being parallel to each other, of a braking wedge having one surface inclined and the opposite surface parallel to the surfaces of the friction plate, the parallel surface of the wedge having a cover of compressible resilient friction material arranged to come into contact with the corresponding friction plate surface, a casing provided with an inclined surface arranged to coact with the inclined surface of the wedge, whereby a longitudinal movement of the wedge in one direction will produce a pressure on one surface of the friction plate normal to such surface, and means arranged to contact with the other surface of the friction plate and give only a straight thrust reaction normal to said plate and in direct opposition to said pressure.

3. The combination, with a friction plate having plane surfaces on opposite sides, said surfaces being parallel to each other, of a braking wedge having one surface inclined and the opposite surface parallel to the surfaces of the friction plate, the parallel surface of the wedge having a cover of compressible resilient friction material arranged to come into contact with the corresponding friction plate surface, a casing provided with an inclined surface arranged to coact with the inclined surface of the wedge, whereby a longitudinal movement of the wedge in one direction will produce a pressure on one surface of the friction plate normal to such surface, and means arranged to contact with the other surface of the friction plate and give only a straight thrust reaction normal to said plate and in direct opposition to said pressure, said means having its surface which contacts with the friction plate, covered with compressible resilient friction material.

4. The combination, with a friction plate having plane surfaces on opposite sides, said surfaces being parallel to each other, of a braking wedge having one surface inclined and the opposite surface parallel to the surfaces of the friction plate, the parallel surface of the wedge having a cover of compressible resilient friction material arranged to come into contact with the corresponding friction plate surface, a casing provided with an inclined surface arranged to coact with the inclined surface of the wedge, whereby a longitudinal movement of the wedge in one direction will produce a pressure on one surface of the friction plate normal to such surface, means arranged to contact with the other surface of the friction plate and give only a straight thrust reaction normal to said plate and in direct opposition to said pressure, and an oil inlet device carried by the casing and arranged to supply oil to said compressible resilient friction material.

5. The combination, with a resilient friction plate having plane surfaces on opposite sides, said surfaces being parallel to each other, of a braking wedge having one surface inclined and the opposite surface parallel to the surfaces of the friction plate, the parallel surface of the wedge having a cover of compressible resilient friction material arranged to come into contact with the corresponding friction plate surface, a casing provided with an inclined surface arranged to coact with the inclined surface of the wedge, whereby a longitudinal movement of the wedge in one direction will produce a pressure on one surface of the friction plate normal to such surface, means arranged to contact with the other surface of the friction plate and give only a straight thrust reaction normal to said plate and in direct opposition to said pressure, the casing having an interior width greater than that of the friction plate which enters it, whereby a play of said plate widthwise is permitted.

6. A shock absorber having the friction plate F, the wedge I having the leather surface $i$ arranged to contact with one side of the plate F, the casing H arranged to coact with the wedge and carrying a leather surface $h$ arranged to contact with the other side of the plate F, and means for securing the casing H and the friction plate F to the vehicle, substantially as described.

7. A shock absorber having the friction plate F, the wedge I having the leather surfaces arranged to contact with one side of the plate F, the casing H arranged to coact with the wedge and carrying a leather surface h arranged to contact with the other side of the plate F, the oil receptacle I for oiling the leather surfaces h and i, and means for securing the casing H and the friction plate F to the vehicle, substantially as described.

8. A shock absorber having the friction plate F, the wedge I having the leather surface i arranged to contact with one side of the plate F, the casing H arranged to coact with the wedge and carrying a leather surface h arranged to contact with the other side of the plate F, said casing having the lug h' and the bolt K for holding it on the vehicle frame, and means for holding the friction plate F to move with the axle, substantially as described.

In testimony whereof, I have hereunto set my hand.

WILLIAM R. RENO.